United States Patent [19]

Rodrigue

[11] 4,195,440
[45] Apr. 1, 1980

[54] FLUID SUCTION DEVICE

[76] Inventor: Wilbrod Rodrigue, 85 Barton St. East, Hamilton, Ontario, Canada, L8L 2N1

[21] Appl. No.: 945,609

[22] Filed: Sep. 25, 1978

[51] Int. Cl.² ............................................. A01G 23/10
[52] U.S. Cl. ...................................... 47/12; 128/276; 417/460
[58] Field of Search ........................................ 47/10–12, 47/57.5; 417/460, 467–469; 128/763, 770, 769, 764, 276, 8, 234–238

[56] References Cited
FOREIGN PATENT DOCUMENTS
21118 of 1911 United Kingdom ........................ 47/10

Primary Examiner—Robert E. Bagwill

[57] ABSTRACT

A fluid suction device is disclosed. The device comprises a cylinder, a piston mounted for sliding movement into the cylinder, a shaft secured to the piston at one end and having a longitudinal bore therein communicating with the cylinder, a suction head secured to the outer end of the shaft and having a longitudinal bore in communication with the bore in the shaft spring means surrounding the shaft for biasing the suction head away from the cylinder, and means for moving the shaft into the cylinder against the action of the spring to create a vacuum at the tip of the suction head to draw fluid into the suction head.

5 Claims, 6 Drawing Figures

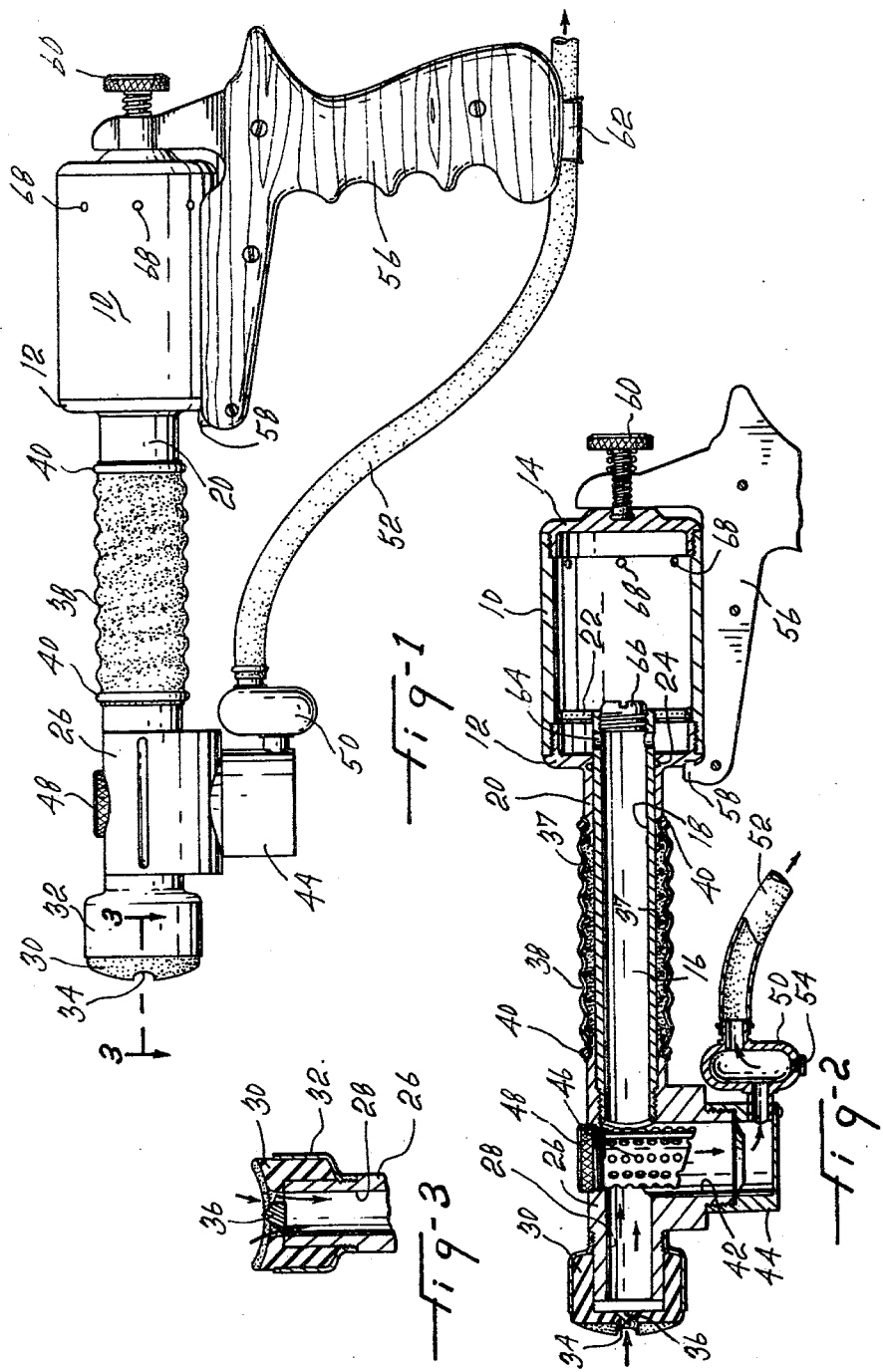

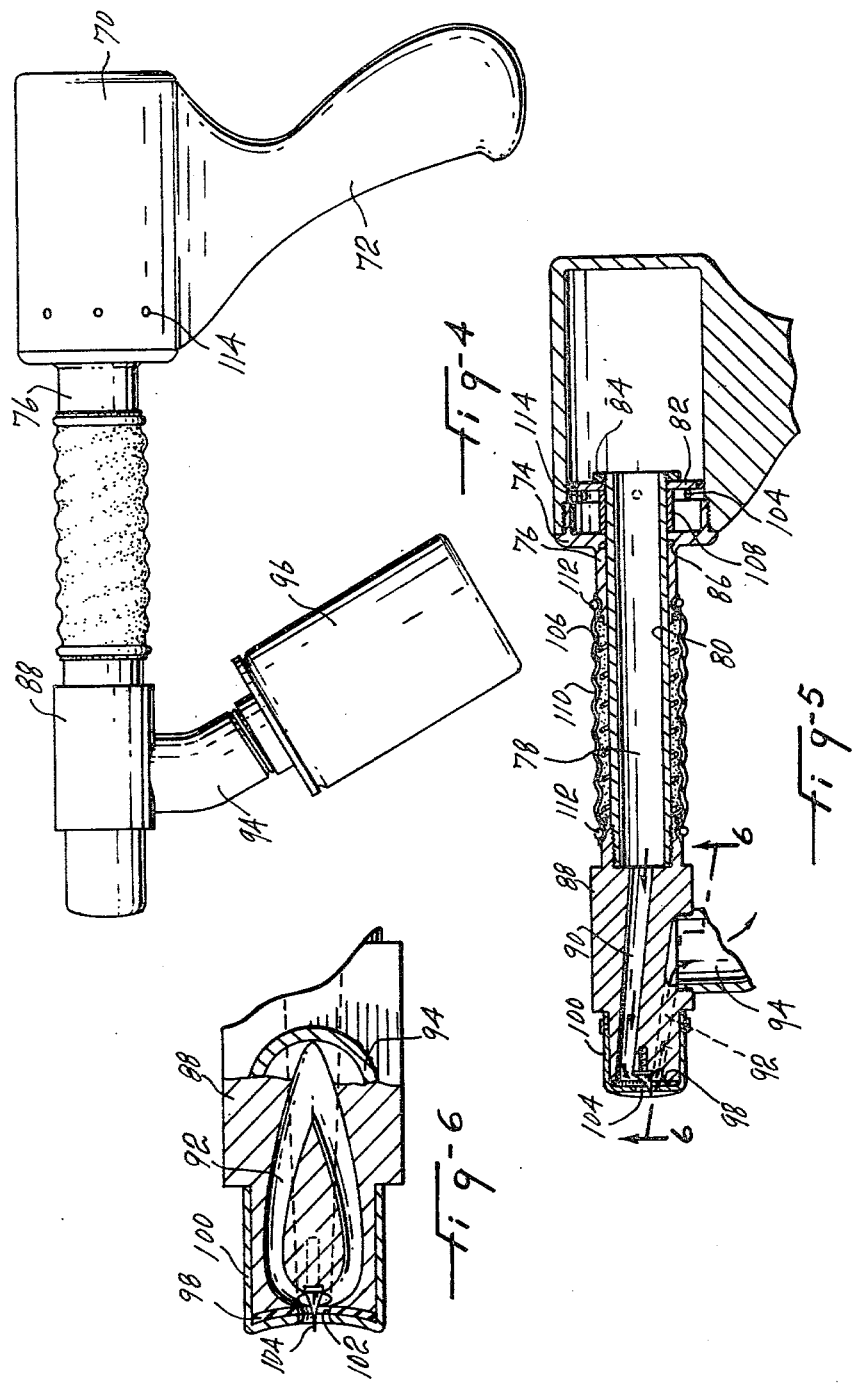

FLUID SUCTION DEVICE

This invention relates to a fluid suction device and, more particularly, to a device for collecting gum from fir-trees.

BACKGROUND OF THE INVENTION

Various types of fluid suction devices are known. However, none of these devices are suitable for collecting viscous fluid, such as gums, from fir-trees, as this gum is sticky and, furthermore, enclosed in a thin skin which must be pierced before the gum can be collected.

SUMMARY OF THE INVENTION

It is, therefore, the object of the present invention to provide a fluid suction device which is easy to operate and can collect viscous fluids and, more particularly, gum from fir-trees.

The suction device in accordance with the invention comprises a cylinder, a piston mounted for sliding movement into the cylinder, a shaft secured to the piston at one end and having a longitudinal bore therein communicating with the cylinder, a suction head secured to the other end of the shaft and having a longitudinal bore in communication with the bore in the shaft, spring means surrounding the shaft for biasing the suction head away from the cylinder, and means for moving the shaft into the cylinder against the action of the spring to create a vacuum at the tip of the suction head to draw fluid into the suction head.

The bore in the shaft may communicate with the vacuum side of the cylinder, so as to create a vacuum in the suction head for drawing fluid into the suction head. Alternatively, the bore in the shaft may communicate with the pressure side of the cylinder and an additional bore may be provided in the suction head in communication with the first-mentioned bore in the suction head for directing the air flow adjacent to the tip of the suction head for drawing fluid into the suction head. A filter is preferably located in the suction head for filtering the fluid. Such fluid is also collected in a special container.

A handle is preferably secured to the cylinder for easy operation of the device. When the suction device is used for collecting gum from fir-trees, a knife is secured to the tip of the suction head for piercing the skin of the gum.

SHORT DESCRIPTION OF THE DRAWINGS

The invention will now be disclosed, by way of example, with reference to preferred embodiments illustrated in the accompanying drawings, in which:

FIG. 1 is a side elevation view of a fluid suction device in accordance with the invention;

FIG. 2 is a longitudinal section view of the device of FIG. 1;

FIG. 3 is a section view taken along line 3—3 of FIG. 1;

FIG. 4 is a side elevation view of a second embodiment of the invention;

FIG. 5 is a longitudinal section view through the device of FIG. 4; and

FIG. 6 is a view taken along line 6—6 of FIG. 5.

DESCRIPTION OF A PREFERRED EMBODIMENT OF THE INVENTION

Referring to FIGS. 1-3, there is shown an embodiment of a suction device comprising a cylinder 10 closed by end plates 12 and 14, which are screwed onto the cylinder. A shaft 16, having a longitudinal bore 18, is slidably mounted in a bushing 20, which is integral with or welded to end cap 12. Shaft 16 is secured at one end to piston 22 mounted within the cylinder and is sealed by O-ring 24. A suction head 26 is threaded, or otherwise mounted, on the other end of the shaft and has a longitudinal bore 28 which is in communication with bore 18 of the shaft. A rubber cap 30, which is fixed to a metal bushing 32, is mounted on the free end of the suction head. The rubber cap has a hole 34 therein in communication with the bore 28 of the suction head. A knife 36 is secured to the end of the suction head and protrudes slightly into the hole 34. A spring 37 surrounds shaft 16 between suction head 26 and bushing 20 and biases the suction head 26 away from cylinder 10. The spring 37 is covered by a flexible hose 38, which is secured to the suction head 22 and to the bushing 20 by spring clips 40.

The suction head is provided with a vertical fluid collecting chamber 42, which is closed by base chamber 44. A filter 46 is located in vertical chamber 42 and the top of the chamber is closed by a top cap 48. An overflow chamber 50 is connected to the base chamber 44 and an overflow pipe 52 leading to a reservoir (not shown) is connected to the overflow chamber. A plug 54 is provided for draining overflow chamber 50.

The cylinder 10 is held by handle 56, which has a catch 58 inserted into end cap 12, and a lock bolt 60, fitting into a hole in an end plate 14. Tube 52 is passed through a clip 62 fixed to the base of the handle 56.

The above-disclosed device is of the suction type. The bore 18 of shaft 16 is in communication with the vacuum side of the cylinder 10 through bores 64 and the end of the shaft is closed by plug 66. Thus, in operation, the tip of the suction head is applied to the gum envelope and the thin membrane is easily pierced by knife 36. Continued pressure applied by handle 56 compresses spring 37 and pushes piston 22 to the right, creating a vacuum in bores 16 and 28 for sucking the gum into the housing 42 through the filter 46. The gum falls into the base chamber 44 and, eventually, when there is enough liquid in the base chamber 44, it overflows through tube 52 to a separate reservoir. Of course, the pressure side of cylinder 10 is provided with openings 68 for evacuation of the air during compression and for filling up the chamber when the piston is returned to the left by the action of spring 37.

FIGS. 4-6 illustrate a second embodiment of the invention which is somewhat similar to the embodiment shown in FIGS. 1-3. In this embodiment, housing 70 is made integral with the handle 72 and is closed by end plate 74, which is integral with, or secured to, a bushing 76. A shaft 78, having a longitudinal bore 80, is slidably mounted in bushing 76 and secured to piston 82 by nut 84. The shaft 78 is sealed by O-ring 86. A suction head 88 is mounted on the other end of shaft 78 and is provided with a longitudinal bore 90, which is in communication with bore 80 of the shaft and with two return bores 92 connected to bore 90. Bores 92 are joined to bore 90 at the tip of the suction head for a purpose to be disclosed later and terminate into the opening of a pipe 94 leading in a container 96. A rubber seal 98, backed by a metal cap 100, is secured in the free end of the suction head. Rubber seal 98 closes the end of the suction head hermetically, except for a central bore 102 in lateral communication with bores 90 and 92. A knife 104 is secured to the end of the suction head and projects through central bore 102 for the same purpose as the corresponding knife shown in the first embodiment.

A spring 106 is positioned around shaft 78 between bushing 76 and suction head 88 for biasing piston 82 to the left-hand side against a spacer bushing 108. Thus spring 106 biases suction head 88 away from the cylinder defined by housing 70. The spring is surrounded by a flexible rubber hose 110 held in place on suction head 88 and on bushing 76 by a spring clip 112.

The above-disclosed embodiment operates the same way as the previously disclosed one, except that the bore in shaft 78 is in communication with the pressure side of the cylinder. Thus, when pressure is applied on handle 72, piston 82 moves to the right to cause air to flow through bore 80 in shaft 78, bore 90 in suction head 88 and back through bores 92 into pipe 94 and container 96. Due to a Venturi effect, this air pressure flow creates a vacuum into the opening 102 at the tip of the suction head to draw fluid into the container 96. The vacuum side of the cylinder 70 is provided with openings 114 for filling of the cylinder during compression and for evacuation of the cylinder when the piston is returned to the left by the action of spring 106.

Although the invention has been disclosed with reference to preferred embodiments, it is to be understood that it is not limited to such embodiments, as other alternatives are also envisaged, but by the scope of the claims only.

I claim:

1. A fluid suction device used for collecting gum from fir trees, which gum is enclosed in a thin skin, said device comprising:
    (a) a cylinder;
    (b) a piston mounted for sliding movement into said cylinder;
    (c) a shaft secured to said piston at one end and having a longitudinal bore therein communicating with the pressure side of said cylinder;
    (d) a suction head secured to the other end of said shaft and having a longitudinal bore in communication with the bore in said shaft and return bores joined to said longitudinal bore at the outer end of said suction head, the latter further having a central bore opening at the tip of said suction head and in lateral communication with the junction of said longitudinal bore with said return bores;
    (e) spring means surrounding said shaft for biasing said suction head away from said cylinder;
    (f) means for moving said shaft into said cylinder against the action of said spring means to produce a pressure flow through said longitudinal bore and said return bores and consequently to create a vacuum at the tip of said suction device to draw fluid into said suction head;
    (g) fluid collecting means communicating with said return bores; and
    (h) a knife secured to the outer end of said suction head and projecting through said central bore for piercing said skin to collect the gum.

2. A fluid suction device used for collecting gum from fir trees, which gum is enclosed in a thin skin, said device comprising:
    (a) a cylinder;
    (b) a piston mounted for sliding movement into said cylinder;
    (c) a shaft secured to said piston at one end and having a longitudinal bore therein communicating with the vacuum side of said cylinder;
    (d) a suction head secured to the other end of said shaft and having a longitudinal bore in communication with the bore in said shaft;
    (e) spring means surrounding said shaft for biasing said suction head away from said cylinder;
    (f) means for moving said shaft into said cylinder against the action of said spring to create a vacuum at the tip of said suction device to draw fluid into said suction head;
    (g) fluid collecting means communicating with the bore of said suction head; and
    (h) a knife secured to the tip of said suction head for piercing said skin to collect the gum.

3. A suction device as defined in claim 1, further comprising a filter located in said suction head for filtering the fluid drawn from the tip of the suction head.

4. A suction device as defined in claim 2 or 1, further comprising a handle for holding said cylinder and defining said means for moving said shaft into said cylinder.

5. A suction device as claimed in claim 2 or 1 further comprising a flexible hose surrounding said spring.

* * * * *